United States Patent
Yazawa et al.

(10) Patent No.: US 8,125,733 B2
(45) Date of Patent: Feb. 28, 2012

(54) PERPENDICULAR MAGNETIC RECORDING HEAD AND MANUFACTURING METHOD THEREOF

(75) Inventors: Hisayuki Yazawa, Niigata-ken (JP); Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 942 days.

(21) Appl. No.: 12/037,369

(22) Filed: Feb. 26, 2008

(65) Prior Publication Data
US 2008/0218908 A1    Sep. 11, 2008

(30) Foreign Application Priority Data
Mar. 9, 2007  (JP) ................................. 2007-059476

(51) Int. Cl.
*G11B 21/21*    (2006.01)
(52) U.S. Cl. .................................................. 360/125.24
(58) Field of Classification Search .............. 360/125.24
See application file for complete search history.

(56) References Cited

U.S. PATENT DOCUMENTS

| | | | | |
|---|---|---|---|---|
| 6,912,106 B1 * | 6/2005 | Chen et al. | ................ | 360/125.42 |
| 7,343,668 B2 * | 3/2008 | Kobayashi | ................ | 29/603.16 |
| 7,463,449 B2 * | 12/2008 | Hirata et al. | ............. | 360/125.03 |
| 7,463,450 B2 * | 12/2008 | Sasaki et al. | ............. | 360/125.24 |
| 7,468,862 B2 * | 12/2008 | Sasaki et al. | ............. | 360/125.02 |
| 7,633,714 B2 * | 12/2009 | Sasaki et al. | ............. | 360/125.3 |
| 7,663,839 B2 * | 2/2010 | Sasaki et al. | ............. | 360/125.03 |
| 2007/0064343 A1 | 3/2007 | Yazawa et al. | | |

FOREIGN PATENT DOCUMENTS

| | | |
|---|---|---|
| JP | 08-106749 | 4/1996 |
| JP | 2006-209940 | 8/2006 |
| JP | 2007-087506 | 4/2007 |

* cited by examiner

*Primary Examiner* — Mark Blouin
(74) *Attorney, Agent, or Firm* — Brinks Hofer Gilson & Lione

(57) ABSTRACT

A perpendicular magnetic recording head includes a main magnetic pole layer; and a return yoke layer laminated on the main magnetic pole layer with a magnetic gap layer formed of a nonmagnetic material disposed on an opposing surface opposite a recording medium. The return yoke layer includes a first throat part opposing the main magnetic pole layer at a side close to the recording medium-opposing surface with a first gap spacing corresponding to a film thickness of the magnetic gap layer; and a second throat part extending to a deeper side than the first throat part in a height direction and opposing the main magnetic pole layer with a second gap spacing greater than the first gap spacing. A throat height determining layer is provided on the main magnetic pole layer or the magnetic gap layer, the throat height determining layer defining a dimension of the first throat part of the return yoke layer in the height direction and formed of an inorganic nonmagnetic material.

6 Claims, 6 Drawing Sheets

PERPENDICULAR MAGNETIC RECORDING HEAD AND MANUFACTURING METHOD THEREOF

RELATED APPLICATIONS

This application claims the benefit of priority under 35 U.S.C. §119 to Japanese Patent Application No. 2007-059476 filed Mar. 9, 2007, the contents of which are hereby incorporated by reference in their entirety.

BACKGROUND OF THE DISCLOSURE

1. Field of the Disclosure

The present disclosure relates to a perpendicular magnetic recording head that records information by applying a perpendicular magnetic field to a recording medium, and to a manufacturing method thereof.

2. Description of the Related Art

Generally, a magnetic head device includes a longitudinal recording (in-plane recording) magnetic head device that applies a magnetic field parallel to a recording medium thereto to perform a recording operation, and a perpendicular magnetic recording head device that applies a magnetic field perpendicular to a recording medium thereto to perform a recording operation. The perpendicular magnetic recording head device is further suitable to increase the recording density. As commonly known, the perpendicular magnetic recording head has a structure in which a main magnetic pole layer and a return path layer are laminated with a nonmagnetic insulating layer therebetween at an opposing surface opposite a recording medium. The main magnetic pole layer is magnetically coupled to the return yoke layer at the side remote from an opposing surface opposite a recording medium in the height direction. Coil layers for applying a recording magnetic field to the main magnetic pole layer and the return path layer are provided in the nonmagnetic insulating layer. When current is supplied to the coil layers, a recording magnetic field is induced between the main magnetic pole layer and the return path layer. In this case, the recording magnetic field is perpendicularly applied to a hard film of the recording medium from the front end surface of the main magnetic pole layer exposed to the medium opposing surface, and the recording magnetic field returns to the return path layer through a soft layer of the recording medium. As a result, a magnetic recording is performed at a portion opposing the main magnetic pole layer. The above-mentioned perpendicular magnetic recording head is disclosed in 2006-209940.

According to a recent proposal regarding a perpendicular magnetic recording head, a so-called shielded pole structure is suggested in which the spacing (gap spacing) between the main magnetic pole layer and the return path layer in the recording medium-opposing surface is narrowed to about 50 nm so that magnetic recording that has little leakage can be realized by controlling (suppressing) divergence of a magnetic flux directed to the recording medium from the main magnetic pole layer.

In a perpendicular magnetic recording head device that has the shielded pole structure, the dimension (throat height) of the return path layer in a height direction as well as the above gap spacing becomes an important parameter for controlling a recording magnetic field (specifically, the recording magnetic field intensity and gradient). It is thus preferable to set this throat height small. However, when the throat height is small, an area of the main magnetic pole layer opposing the return path layer decreases. Accordingly, since the magnetic flux from the main magnetic pole layer toward the return path layer is likely to leak, the intensity of the recording magnetic field increases. However, since the magnetic flux returning from the main magnetic pole layer toward the return path layer is likely to be dispersed, it is difficult to sufficiently increase the gradient of the magnetic field. On the other hand, when the throat height is large, an area of the main magnetic pole layer opposing the return path layer increases. Accordingly, since the magnetic flux is likely to flow from the main magnetic pole layer toward the return path layer, the gradient of the magnetic field is improved. However, since the magnetic flux from the main magnetic pole layer toward the return path layer decreases, the gradient of the magnetic field decreases. A method that solves such a problem has been proposed by the present applicant in Japanese Patent Application No. 2005-275558 (corresponding to US Patent Application Publication No. 2007-064343). According to the proposed method, a return yoke layer having a two-step structure includes a first throat part that opposes a main magnetic pole layer with a first gap spacing and a second throat part that extends to a deeper side than the first throat part in the height direction and that opposes the main magnetic pole layer with a second gap spacing greater than the first gap spacing. Specifically, the opposing distance between the main magnetic pole layer and the return yoke layer is narrowed at a recording medium-opposing surface side and is broadened at the deeper side in the height direction. Accordingly, the recording magnetic field intensity and the recording magnetic field gradient are improved.

As a method for defining a throat height of the return yoke layer, there is known a method in which a positioning layer formed of an organic resist material is formed at a position retreated from the recording medium-opposing surface to a position where a desired throat height is obtained. Alternatively, a method in which a return yoke layer having a desired throat height is formed by a plating method is used. In the latter method, an insulating layer composed of an inorganic nonmagnetic material such as alumina is filled in the deeper side of the return yoke layer in the height direction. The upper surface of the insulating layer and the upper surface of the return yoke layer are generally planarized by a polishing process.

However, when the throat height is defined by the positioning layer formed of an organic resist material, since the thermal expansion coefficient of the positioning layer is much larger than that of the neighboring return yoke layer or the nonmagnetic insulating material layer, the positioning layer may thermally expand during operation of the head. The end surfaces of the return yoke layer in the height direction are deformed, and thus defects, such as peeling of the layer, are caused. On the other hand, when the return yoke layer is formed by defining a throat height using a plating method, the manufacturing process includes forming a plated underlayer film, forming a return yoke layer on the plated underlayer film by a plating method to a dimension at which a desired throat height is obtained, and removing the plated underlayer film that is not necessary. In the course of the manufacturing process, the dimensional precision of the throat height is deteriorated compared with the case of using the positioning layer. Moreover, when the throat height is short, there is high possibility of cracking in the return yoke layer when mechanical stress is applied thereto.

SUMMARY OF THE DISCLOSURE

The present disclosure provides a perpendicular magnetic recording head that includes a main magnetic pole layer; and a return yoke layer laminated on the main magnetic pole layer with a magnetic gap layer formed of a nonmagnetic material disposed on an opposing surface opposite a recording medium. The return yoke layer includes a first throat part opposing the main magnetic pole layer at a side close to the recording medium-opposing surface with a first gap spacing corresponding to a film thickness of the magnetic gap layer; and a second throat part extending to a deeper side than the first throat part in a height direction and opposing the main magnetic pole layer with a second gap spacing greater than the first gap spacing. A throat height determining layer is provided on the main magnetic pole layer or the magnetic gap layer, the throat height determining layer defining a dimension of the first throat part of the return yoke layer in the height direction and formed of an inorganic nonmagnetic material.

The present disclosure provides a manufacturing method of a perpendicular magnetic recording head, comprising the steps of: forming a throat height determining layer on a main magnetic pole layer at a position of a front end surface thereof retreated from a position serving as an opposing surface opposite a recording medium by a desired distance in a height direction, the throat height determining layer defining the dimension of the return yoke layer in the height direction and formed of an inorganic nonmagnetic material; forming a magnetic gap layer on the throat height determining layer and the exposed main magnetic pole layer to thereby transfer the front end surface position of the throat height determining layer onto the surface of the magnetic gap layer; and forming a return yoke layer on the magnetic gap layer having the front end surface position transferred thereto, the return yoke layer being formed of an magnetic material, thereby forming first and second throat parts on the return yoke layer. The first throat part defines the dimension of the return yoke layer in the height direction at the front end surface position of the throat height determining layer and opposes the main magnetic pole layer with a first gap spacing corresponding to a film thickness of the magnetic gap layer. The second throat part extends to a deeper side than the first throat part in a height direction and opposes the main magnetic pole layer with a second gap spacing corresponding to the total film thickness of the magnetic gap layer and the throat height determining layer.

The present disclosure also provides a manufacturing method of a perpendicular magnetic recording head, comprising the steps of: forming a magnetic gap layer on a main magnetic pole layer, the magnetic gap layer being formed of a nonmagnetic material; forming a throat height determining layer on the magnetic gap layer at a position of a front end surface thereof retreated from a position serving as an opposing surface opposite a recording medium by a desired distance in a height direction, the throat height determining layer defining the dimension of the return yoke layer in the height direction as the desired distance and formed of an inorganic nonmagnetic material; and forming a return yoke layer on the throat height determining layer and the exposed magnetic gap layer, the return yoke layer being formed of an magnetic material, thereby forming first and second throat parts on the return yoke layer. The first throat part defines the dimension of the return yoke layer in the height direction at the front end surface position of the throat height determining layer and opposes the main magnetic pole layer with a first gap spacing corresponding to a film thickness of the magnetic gap layer. The second throat part extends to a deeper side than the first throat part in a height direction and opposes the main magnetic pole layer with a second gap spacing corresponding to the total film thickness of the magnetic gap layer and the throat height determining layer.

According to the embodiments of the present disclosure, since the dimension of the return yoke layer in the height direction is defined by the throat height determining layer formed of an inorganic nonmagnetic material, it is possible to define the dimension of the return yoke layer in the height direction with high precision. Accordingly, it is possible to provide a perpendicular magnetic recording head and a manufacturing method which can define the dimension of a return yoke layer in the height direction with high precision and prevent deformation and cracking of the return yoke layer by external thermal or mechanical stress.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DESCRIPTION OF THE PREFERRED EMBODIMENTS

Exemplary embodiments may be better understood with reference to the drawings, but these examples are not intended to be of a limiting nature. Like numbered elements in the same or different drawings perform equivalent functions.

The present disclosure will now be described with reference to drawings, covering various non-exhaustive embodiments. In each of the drawings, the X direction is the track width direction, the Y direction is the height direction, and the Z direction is the moving direction of a recording medium M.

Figure 1:
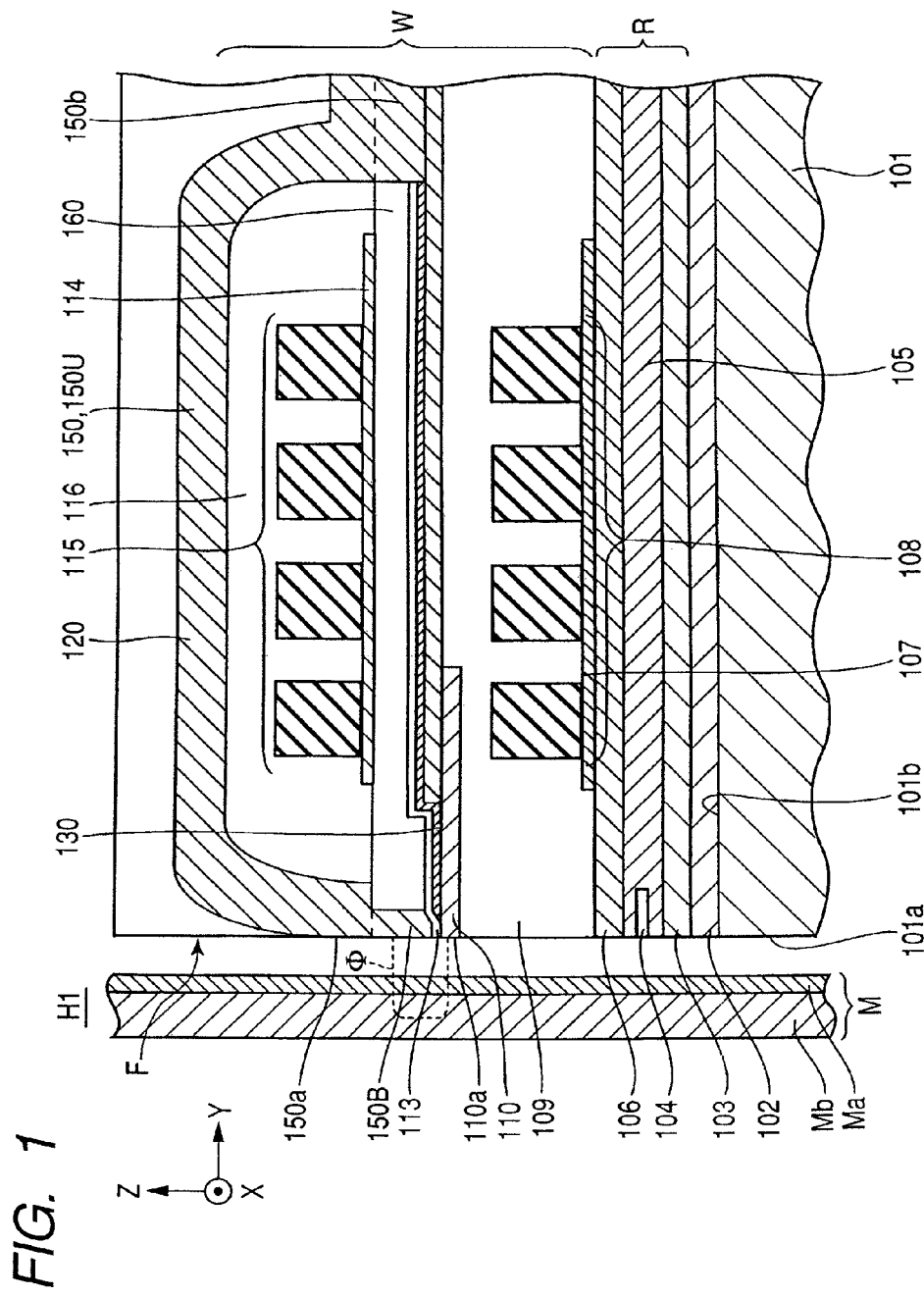
FIG. 1 is a partly longitudinal sectional view showing an overall structure of a perpendicular magnetic recording head according to a first embodiment of the present disclosure.
Figure 2:
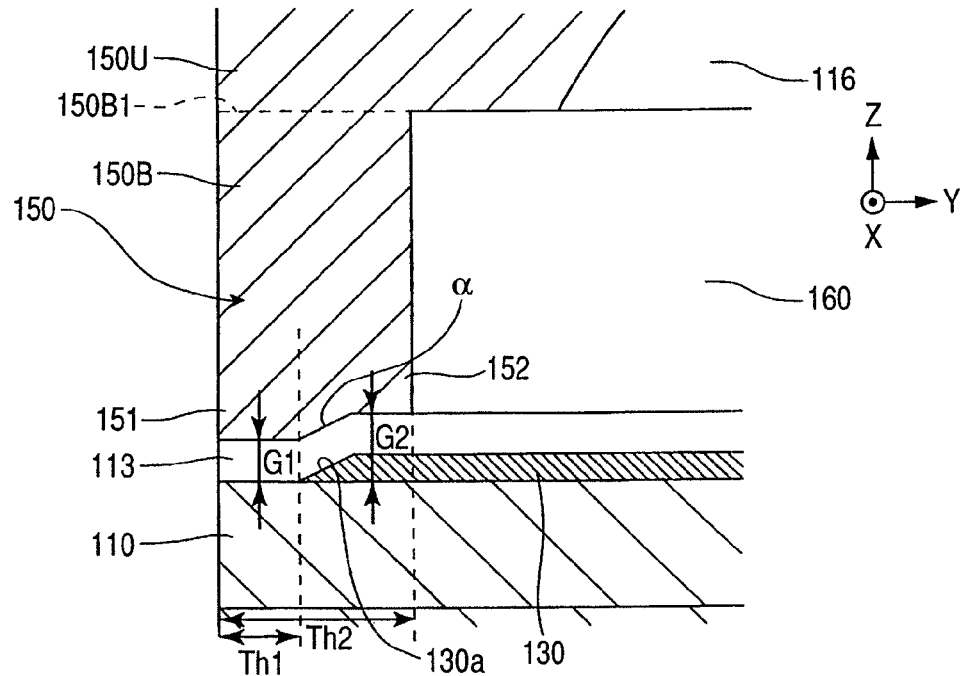
FIG. 2 is an enlarged sectional view of a write section in the vicinity of a recording medium-opposing surface of the perpendicular magnetic recording head according to the first embodiment.

FIGS. 1 to 7 show a perpendicular magnetic recording head H1 according to a first embodiment of the present disclosure. FIG. 1 is a partly longitudinal sectional view showing an overall structure of the perpendicular magnetic recording head H1. FIG. 2 is an enlarged sectional view of a write section W in the vicinity of a recording medium-opposing surface F of the perpendicular magnetic recording head H1, particularly showing a main magnetic pole layer 110, a magnetic gap layer 113, a throat height determining layer 130, and a return yoke layer 150.

In the perpendicular magnetic recording head H1, a writing operation is conducted by applying a perpendicular magnetic field Φ to a recording medium M to thereby magnetize a hard film Ma of the recording medium M in the perpendicular direction. The recording medium M includes the hard film Ma with a higher residual magnetization at the surface side and a soft film Mb with a higher magnetic permeability at the inner side of the hard film Ma. The recording medium M is, for example, disk-shaped and is rotated by a spindle motor about the center of the disk, which serves as the axis of rotation. A slider 101 is composed of a nonmagnetic material such as $Al_2O_3$ or TiC. A medium-opposing surface 101a of the slider 101 opposes the recording medium M. As the recording medium M is rotated, the slider 101 floats up from the surface of the recording medium M by the airflow on the surface.

A nonmagnetic insulating layer 102 composed of an inorganic material such as $Al_2O_3$ or $SiO_2$ is formed on a trailing side-end surface 101b of the slider 101. A read section R is formed on the nonmagnetic insulating layer 102. The read section R includes a lower shield layer 103, an upper shield layer 106, an inorganic insulating layer (gap insulating layer) 105 that fills the space between the lower shield layer 103 and the inorganic insulating layer 106, and a read element 104 located in the inorganic insulating layer 105. The read element 104 is a magnetoresistive (MR) element such as AMR (anisotropic MR), GMR (giant MR), and TMR (tunneling MR).

A plurality of first coil layers 108 made of a conductive material is formed on a coil insulating underlayer 107 on the upper shield layer 106. The first coil layers 108 are each formed, for example, of at least one or two nonmagnetic metal materials selected from the group consisting of Au, Ag, Pt, Cu, Cr, Al, Ti, NiP, Mo, Pd, and Rh. Alternatively, a laminate structure composed of the nonmagnetic metal materials mentioned above may be formed. A coil insulating layer 109 is formed around the first coil layers 108.

An upper surface of the coil insulating layer 109 is flattened, and a plated underlayer (not shown) is formed on the flattened surface. A main magnetic pole layer 110 is formed on the plated underlayer. The main magnetic pole layer 110 is formed, for example, of a ferromagnetic material having a high saturation magnetic flux density such as Ni—Fe, Co—Fe, or Ni—Fe—Co. The main magnetic pole layer 110 has a front end surface 110a exposed to a medium opposing surface F. The dimension of the front end surface 110a in the track width direction is defined as a track width Tw. In this embodiment, the main magnetic pole layer 110 is not formed on the entire surface of the coil insulating layer 109 but is locally formed on a portion of the coil insulating layer 109 close to the recording medium-opposing surface F. The main magnetic pole layer 110 has an end surface 110b in the height direction. The end surface 110b is magnetically coupled to an auxiliary yoke layer 111. The auxiliary yoke layer 111 is composed of a magnetic material having a magnetic flux saturation density lower than that of the main magnetic pole layer 110. The auxiliary yoke layer 111 has a function of guiding a magnetic flux of the recording magnetic field induced by a recording coil (first and second coil layers 108 and 115) to the main magnetic pole layer 110.

On the recording medium-opposing surface F side, a magnetic gap layer 113 composed of an inorganic nonmagnetic insulating material such as $Al_2O_3$ or $SiO_2$ is formed on the main magnetic pole layer 110. In this embodiment, the magnetic gap layer 113 is formed of $Al_2O_3$ and has a uniform film thickness. A second coil layer 115 is formed on an inorganic nonmagnetic material layer 160 and a coil insulating underlayer 114 formed on the magnetic gap layer 113. The second coil layer 115 is disposed at the deeper side than the recording medium-opposing surface F in the height direction. A plurality of the second coil layers 115 are formed of a conductive material in a manner similar to the first coil layer 108. The second coil layers 115 are, for example, composed of at least one or two nonmagnetic metal materials selected from the group consisting of Au, Ag, Pt, Cu, Cr, Al, Ti, NiP, Mo, Pd, and Rh. Alternatively, the second coil layers 115 may have a laminated structure in which these nonmagnetic metal materials are laminated.

The first and second coil layers 108 and 115 have their respective ends in the track width direction (the X direction in the drawing) electrically connected to each other such that they form a toroid. The shapes of the coil layers (magnetic field generating means) are not limited to the toroid.

A coil insulating layer 116 is formed around the second coil layers 115. A return yoke layer 150 composed of a ferromagnetic material having a saturation magnetic field density such as Ni—Fe, Co—Fe or Ni—Fe—Co is formed over the coil insulating layer 116 and the magnetic gap layer 113. The return yoke layer 150 has a front end surface 150a exposed to the recording medium-opposing surface F and a magnetic connecting part 150b connected to the auxiliary yoke layer 111 at the deeper side in the height direction. The return yoke layer 150 is covered with a protective layer 120 composed of an inorganic nonmagnetic insulating material.

In the perpendicular magnetic recording head H1, as shown in FIG. 2, a throat height determining layer 130 is provided between the main magnetic pole layer 110 or the auxiliary yoke layer 111 and the magnetic gap layer 113. The throat height determining layer 130 is composed of an inorganic nonmagnetic material such as $Al_2O_3$ or $SiO_2$. In this embodiment, the throat height determining layer 130 is formed of $SiO_2$.

In the throat height determining layer 130, the dimension (a first throat height) Th1 of the return yoke layer 150 in the height direction is defined by the position of an front end surface 130a retreated from the recording medium-opposing surface F (i.e., the distance from the recording medium-opposing surface F to the front end surface 130a). By designing the first throat height Th1 so as to be small, the area of the main magnetic pole layer 110 opposing the return yoke layer 150 can be decreased. Thus, the amount of magnetic fluxes from the main magnetic pole layer 110 to the recording medium M increases, thereby increasing the recording magnetic field intensity. The front end surface 130a of the throat height determining layer 130 forms a stepped part a that broadens an opposing spacing (gap spacing) between the main magnetic pole layer 110 and the return yoke layer 150 as the front end surface 130a extends from the recording medium-opposing surface F (the front end surfaces 150a and 110a) in the height direction. In this embodiment, the front end surface 130a is designed to form a tapered surface of which the film thickness gradually increases as the surface extends in the height direction. However, the front end surface 130a may be designed to form a rectangular end surface perpendicular with respect to the height direction. The film thickness of the throat height determining layer 130 is designed so as to be smaller than the first throat height Th1.

The return yoke layer 150 includes a first throat part 151 formed at the stepped part α corresponding to the front end surface 130a of the throat height determining layer 130. The first throat part 151 opposes the main magnetic pole layer 110 with a first gap spacing G1 in the front end surface 150a. The return yoke layer 150 further includes a second throat part 152 that extends to the deeper side than the first throat part 151 in the height direction and opposes the main magnetic pole layer 110 with a second gap spacing G2 larger than the first gap spacing G1 (G2>G1). The dimension (first throat height Th1) of the first throat part 151 in the height direction is defined by the throat height determining layer 130. The dimension (second throat height Th2) of the second throat part 152 in the height direction is greater than the first throat height Th1. Specifically, the first throat height Th1 is about 0.1 µm, and the second throat height Th2 is about 0.3 µm. The step difference between the first throat part 151 and the second throat part 152 corresponds to the film thickness of the stepped part α, i.e., the throat height determining layer 130 and is designed small.

As a result of using the two-stepped throat shape, even when the first throat height Th1 is small, by designing the gap spacing G1 at the recording medium-opposing surface F (front end surfaces 110a and 150a) side so as to be small, it is possible to prevent divergence of a magnetic flux oriented toward the return yoke layer 150 from the main magnetic pole layer 110. Thus, the recording magnetic field gradient characteristics can be improved. At the same time, by setting the gap spacing G2 at the deeper side in the height direction, even when the second throat height Th2 of the return yoke layer 150 is large, it is not necessary to suppress divergence of a magnetic flux oriented toward the recording medium M from the main magnetic pole layer 110. Thus, high recording magnetic field intensity can be maintained. The first gap spacing G1 is the same as the film thickness of the magnetic gap layer 113 and is about 50 nm. The second gap spacing G2 is the same as the total film thickness of the magnetic gap layer 113 and the throat height determining layer 130 and is about 100 nm.

In the return yoke layer 150 of this embodiment, the first and second throat parts 151 and 152 are disposed on a bottom layer 150B and the magnetic connecting part 150b. The magnetic connecting part 150b and the bottom layer 150B are connected to each other by an upper layer 150U. Although the upper layer 150U and the magnetic connecting part 150b are separately formed and then laminated on each other, they may be integrally formed. An inorganic nonmagnetic material layer 160 is formed around the bottom layer 150B and the magnetic connecting part 150b of the return yoke layer 150. The upper surface of the bottom layer 150B, the upper surface of the magnetic connecting part 150b, and the upper surface of the inorganic nonmagnetic material layer 160 are disposed on the same surface (i.e., the upper surfaces are planarized).

Next, a manufacturing method of the thin film magnetic head H1 will be described with reference to FIGS. 3 to 7. In the following descriptions, only a process step for forming the throat height determining layer 130, the magnetic gap layer 113, and the return yoke layer 150 will be described. Since layers other than the above layers can be formed using an ordinary method, process steps for forming such layers will be omitted.

Figure 3:
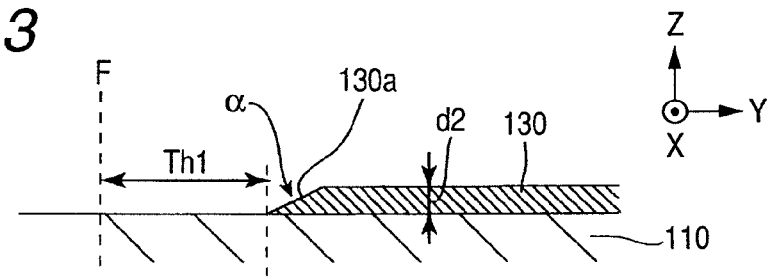
FIG. 3 is a sectional view showing a process step of a manufacturing method of the perpendicular magnetic recording head.

First, as shown in FIG. 3, the throat height determining layer 130 is formed on the main magnetic pole layer 110 and the auxiliary yoke layer 111 at a position retreated from a position serving as the recording medium-opposing surface F by a desired, first throat height Th1 in the height direction. The throat height determining layer 130 is formed of $SiO_2$. The film thickness (maximum film thickness) d2 of the throat height determining layer 130 is designed so as to be smaller than the first throat height Th1 (d2<Th1) so that the step difference between the first throat part and the second throat part of the return yoke layer to be formed later. The throat height determining layer 130 can be formed by a lift-off process or a dry etching process.

Figure 4:
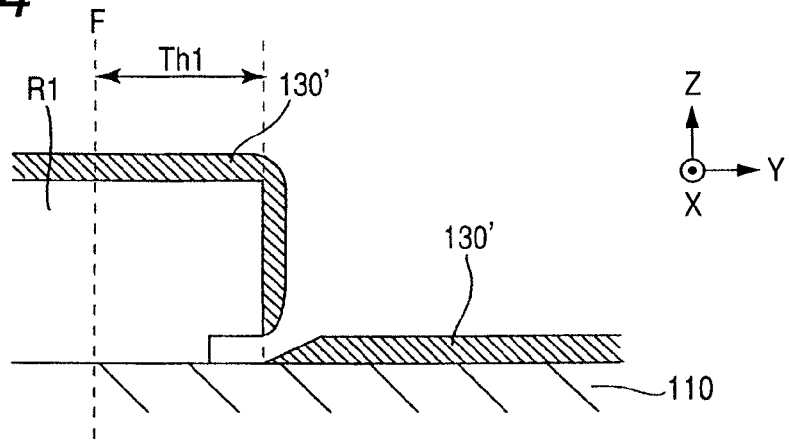
FIG. 4 is a sectional view for describing the case in which a throat height determining layer shown in FIG. 3 is formed by a lift-off process.

In the case of using the lift-off process, as shown in FIG. 4, a lift-off resist R1 is formed so as to cover a region at which the distance from a position serving as the recording medium-opposing surface F to the region in the height direction becomes smaller than the desired, first throat height Th1. Then, a $SiO_2$ film 130' is formed on the entire surface of the main magnetic pole layer 110, the auxiliary yoke layer 111, and the lift-off resist R1. Thereafter, the lift-off resist R1 and an unnecessary $SiO_2$ film 130' are removed. In this way, as shown in FIG. 3, a throat height determining layer 130 is obtained in which a front end surface 130a forms a stepped part α on the main magnetic pole layer 110.

Figure 5:
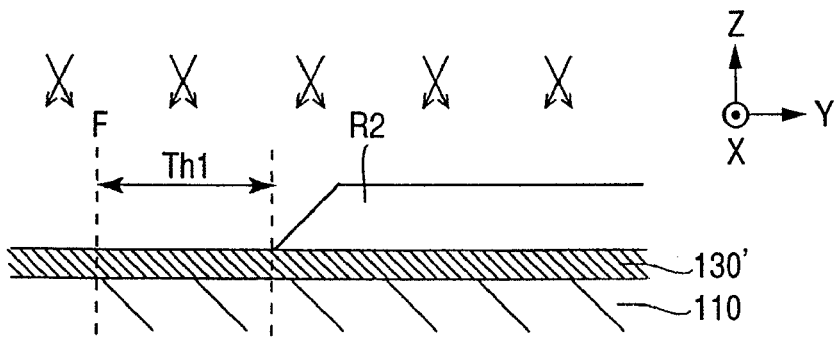
FIG. 5 is a sectional view for describing the case in which a throat height determining layer shown in FIG. 3 is formed by a dry etching process.

In the case of using the dry etching process, as shown in FIG. 5, a $SiO_2$ film 130' is formed on the entire surface of the main magnetic pole layer 110 and the auxiliary yoke layer 111. Then, a resist R2 is formed so as to cover a region at which the distance from a position serving as the recording medium-opposing surface F to the region in the height direction becomes equal to or greater than the desired, first throat height Th1. Then, the $SiO_2$ film 130' not covered with the resist R2 is removed by an Argon-ion milling process. Thereafter, the resist R2 is removed. In this way, as shown in FIG. 3, a throat height determining layer 130 is obtained in which a front end surface 130a forms a stepped part α on the main magnetic pole layer 110. In FIG. 5, the arrows denote the milling direction.

In the throat height determining layer 130 formed by the lift-off process or the dry etching process, the front end surface 130a has such a tapered shape that the film thickness of the front end surface 130a gradually increases as it extends to the deeper side in the height direction. The distance from the position serving as the recording medium-opposing surface F to the front end surface 130a defines the first throat height Th1. The front end surface 130a may be a parallel surface with respect to the film thickness direction (the Z direction in the drawing). Since the stepped part α formed on the main magnetic pole layer 110 by the front end surface 130a has a tapered shape, it is possible to improve the cohesive properties of the throat height determining layer 130 with respect to a layer formed thereon, compared with the case in which the stepped part α has a stair-step shape. Thus, it becomes less sensitive to subsequent process steps and the reliability is improved.

Figure 6:
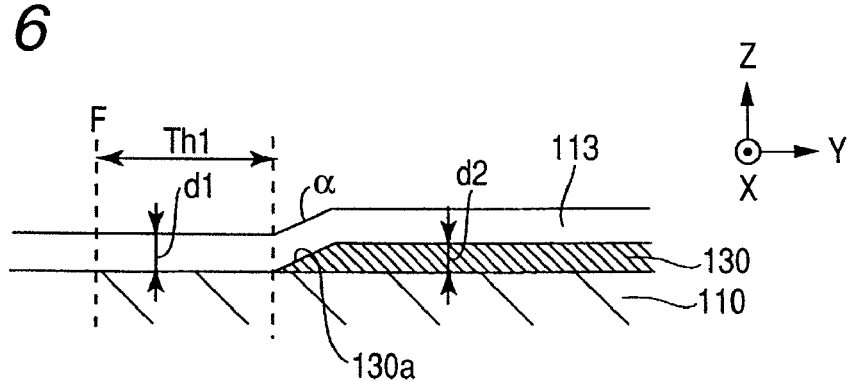
FIG. 6 is a sectional view showing a process step subsequent to the process step shown in FIG. 3.

Next, as shown in FIG. 6, a magnetic gap layer 113 formed of $Al_2O_3$ is formed on the entire surface of the exposed main magnetic pole layer 110 and throat height determining layer 130 to a uniform film thickness d1. The film thickness d1 of the magnetic gap layer 113 in this film forming step defines the first gap spacing G1. The stepped part α corresponding to the front end surface 130a of the throat height determining layer 130 is transferred to the upper surface of the magnetic gap layer 113.

Figure 7:
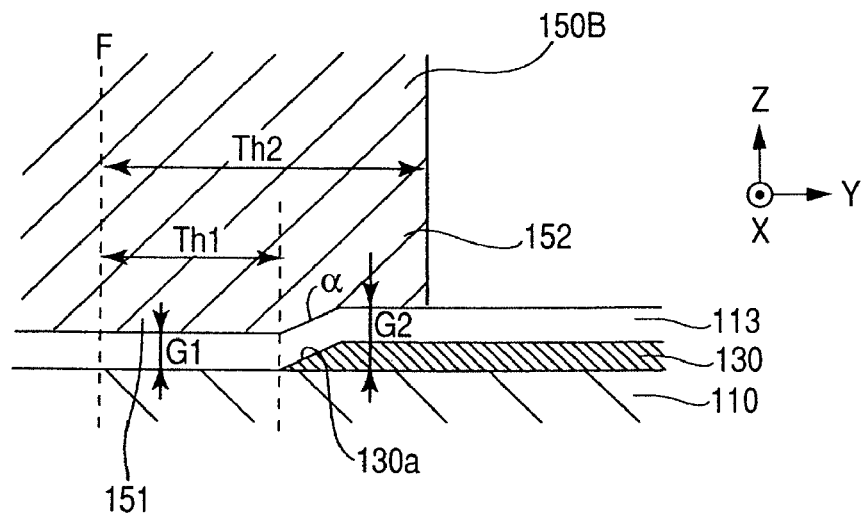
FIG. 7 is a sectional view showing a process step subsequent to the process step shown in FIG. 6.

Subsequently, as shown in FIG. 7, a bottom layer 150B of the return yoke layer 150 is formed on the magnetic gap layer 113 having the stepped part α thereon. The bottom layer 150B is formed of a ferromagnetic material having a high saturation magnetic flux density such as Ni—Fe, Co—Fe, or Ni—Fe—Co. The bottom layer 150B is formed to have a maximum thickness in the height direction corresponding to the second throat height Th2. The bottom layer 150B can be formed at the same time as the magnetic connecting part 150b on the auxiliary yoke layer 111 by a plating method. In this way, on the bottom layer 150B of the return yoke layer 150, the first and second throat parts 151 and 152 are formed with the stepped part a disposed on the magnetic gap layer 113. Specifically, the first throat part 151 opposes the main magnetic pole layer 110 with the first gap spacing G1 (d1) at the recording medium-opposing surface F side and has a first throat height Th1. The second throat part 152 extends to the deeper side than the first throat part 151 in the height direction so as to oppose the main magnetic pole layer 110 with the second gap spacing G2 (=d1+d2) and has a second throat height Th2.

Subsequently, the bottom surface 150B of the return yoke layer 150 and the upper surface and the surroundings of the magnetic connecting part 150b are filled with the inorganic nonmagnetic material layer 160 such as $Al_2O_3$ or $SiO_2$. A polishing process (CMP: chemical mechanical polishing) is performed up to a position where the bottom layer 150B and the magnetic connecting part 150b can have a desired film thickness. Thereafter, the coil insulating underlayer 114, the second coil layer 115, and the coil insulating layer 116 are formed on the upper surface 150B1 (FIG. 2) of the bottom surface 150B planarized by the CMP process. The upper surface 150U of the return yoke layer 150 and the protective layer 120 are laminated thereon. An end surface serving as the recording medium-opposing surface F is mechanically polished to form the recording medium-opposing surface F. As described above, the step difference between the first throat part 151 and the second throat part 152 is small and there is not a sharply uneven surface on the bottom surface 150B of the return yoke layer 150. Therefore, there is little possibility of generating cracking in the bottom layer 150B when mechanical stress is applied thereto by a mechanical polishing process.

In this way, the perpendicular magnetic recording head H1 according to the first embodiment shown in FIGS. 1 and 2 is obtained.

Figure 8:
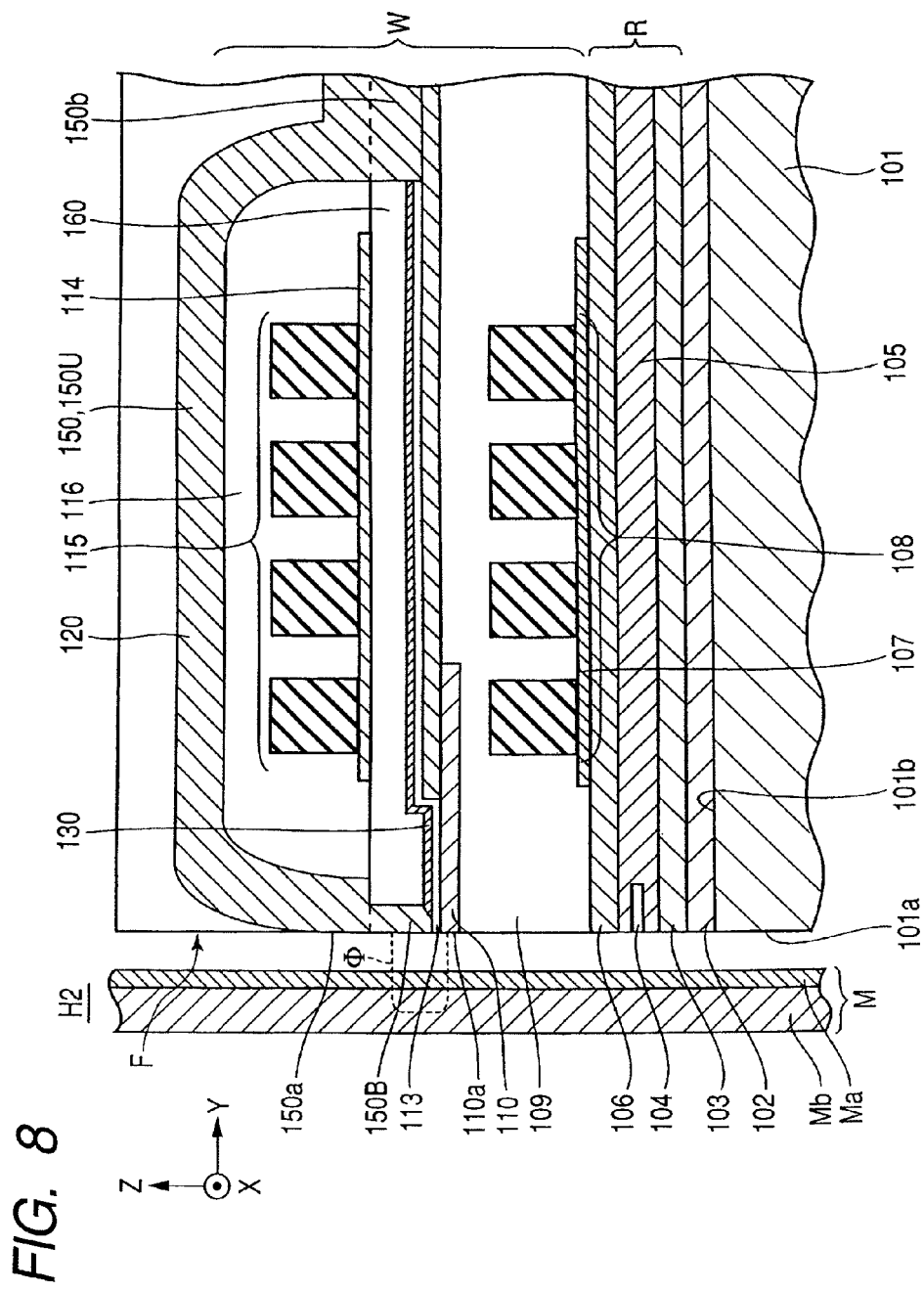
FIG. 8 is a partly longitudinal sectional view showing an overall structure of a perpendicular magnetic recording head according to a second embodiment of the present disclosure.
Figure 9:
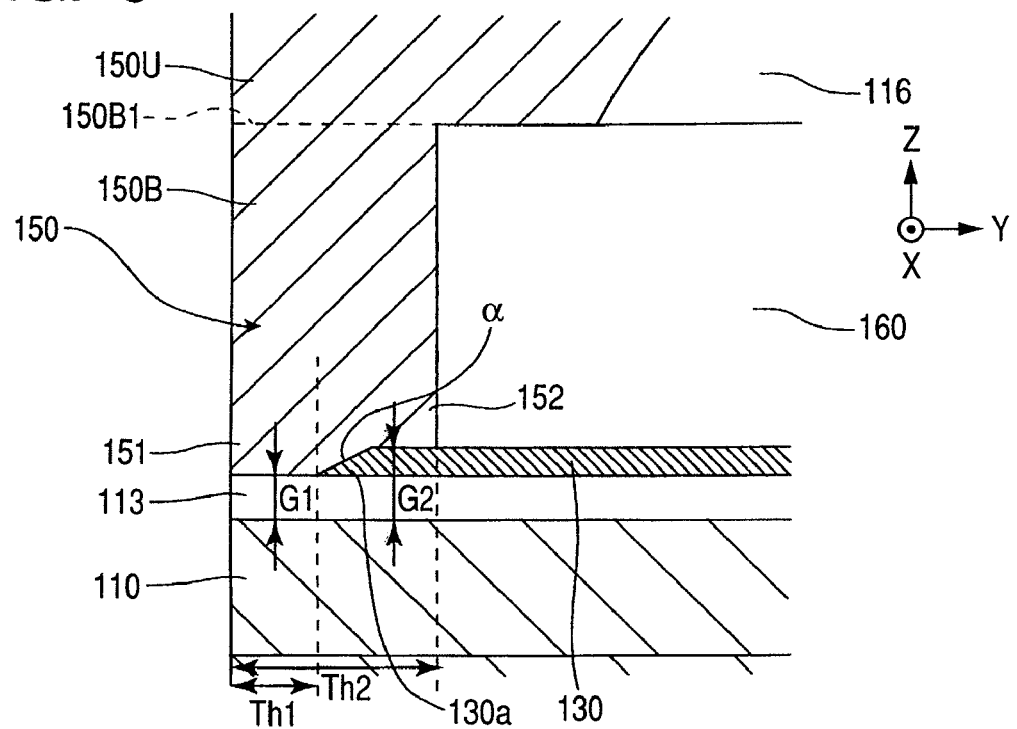
FIG. 9 is an enlarged sectional view of a write section in the vicinity of a recording medium-opposing surface of the perpendicular magnetic recording head according to the second embodiment.

FIGS. 8 to 13 show a perpendicular magnetic recording head H2 according to a second embodiment of the present disclosure. FIG. 8 is a partly longitudinal sectional view showing an overall structure of the perpendicular magnetic recording head H2. FIG. 9 is an enlarged sectional view of a write section W in the vicinity of a recording medium-opposing surface F of the perpendicular magnetic recording head H2, particularly showing a main magnetic pole layer 110, a magnetic gap layer 113, a throat height determining layer 130, and a return yoke layer 150. In the second embodiment, the lamination order of the magnetic gap layer 113 and the throat height determining layer 130 is reversed from that of the first embodiment. Specifically, on the main magnetic pole layer 110, the magnetic gap layer 113 and the throat height determining layer 130 are laminated on each other in this order. Other construction other than the lamination order is the same as that of the first embodiment. In FIGS. 8 and 9, elements having the same function as the first embodiment will be referenced by the same reference numeral as used in FIGS. 1 and 2.

Next, a manufacturing method of the thin film magnetic head H2 will be described with reference to FIGS. 10 to 13. In the following descriptions, only a process step for forming the throat height determining layer 130, the magnetic gap layer 113, and the return yoke layer 150 will be described. Since layers other than the above layers can be formed using an ordinary method, process steps for forming such layers will be omitted.

Figure 10:
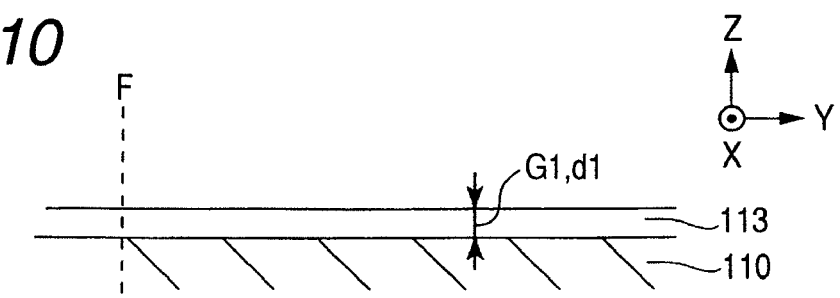
FIG. 10 is a sectional view showing a process step of a manufacturing method of the perpendicular magnetic recording head.

First, as shown in FIG. 10, a magnetic gap layer 113 formed of $Al_2O_3$ is formed on the entire surface of the main magnetic pole layer 110 and the auxiliary yoke layer 111 to a uniform film thickness d1. The film thickness d1 of the magnetic gap layer 113 in this film forming step defines the first gap spacing G1.

Figure 11:
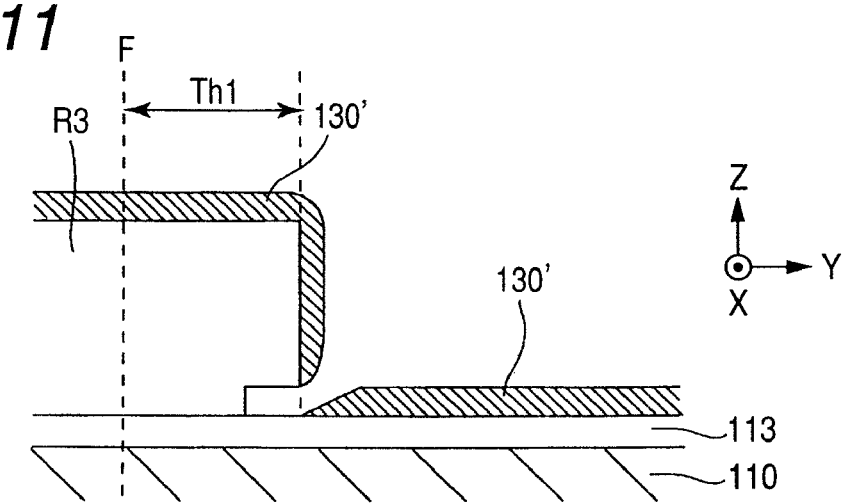
FIG. 11 is a sectional view showing a process step subsequent to the process step shown in FIG. 10.
Figure 12:
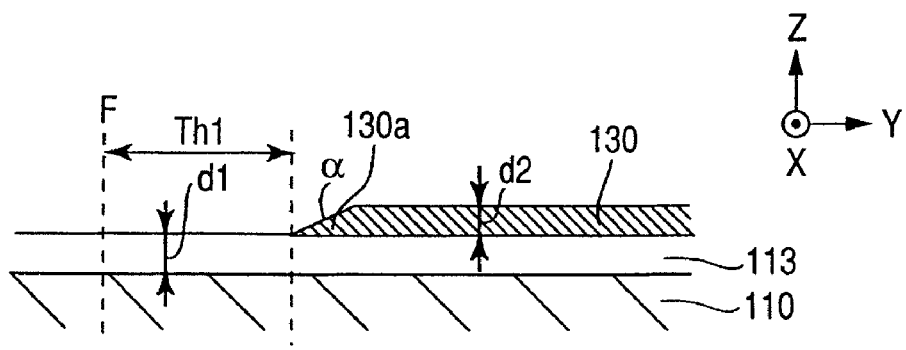
FIG. 12 is a sectional view showing a process step subsequent to the process step shown in FIG. 11.

Subsequently, as shown in FIG. 12, the throat height determining layer 130 is formed on the magnetic gap layer 113 at a position retreated from a position serving as the recording medium-opposing surface F by a desired, first throat height Th1 in the height direction. The throat height determining layer 130 is formed of $SiO_2$. The film thickness (maximum film thickness) d2 of the throat height determining layer 130 is designed so as to be smaller than the first throat height Th1 (d2<Th1) so that the step difference between the first throat part and the second throat part of the return yoke layer to be formed later. The throat height determining layer 130 can be formed by a lift-off process or a dry etching process. That is, as shown in FIG. 11, a lift-off resist R3 is formed so as to cover a region at which the distance from a position serving as the recording medium-opposing surface F to the region in the height direction becomes smaller than the desired, first throat height Th1. Then, a $SiO_2$ film 130' is formed on the entire surface of the magnetic gap layer 113 and the lift-off resist R3. Thereafter, the lift-off resist R3 and an unnecessary $SiO_2$ film 130' are removed. In this way, as shown in FIG. 12, a throat height determining layer 130 is obtained in which a front end surface 130a forms a stepped part a on the magnetic gap layer 113. In the throat height determining layer 130, the front end surface 130a has such a tapered shape that the film thickness of the front end surface 130a gradually increases as it extends to the deeper side in the height direction. The distance from the position serving as the recording medium-opposing surface F to the front end surface 130a defines the first throat height Th1. The front end surface 130a may be a parallel surface with respect to the film thickness direction (the Z direction in the drawing).

Figure 13:
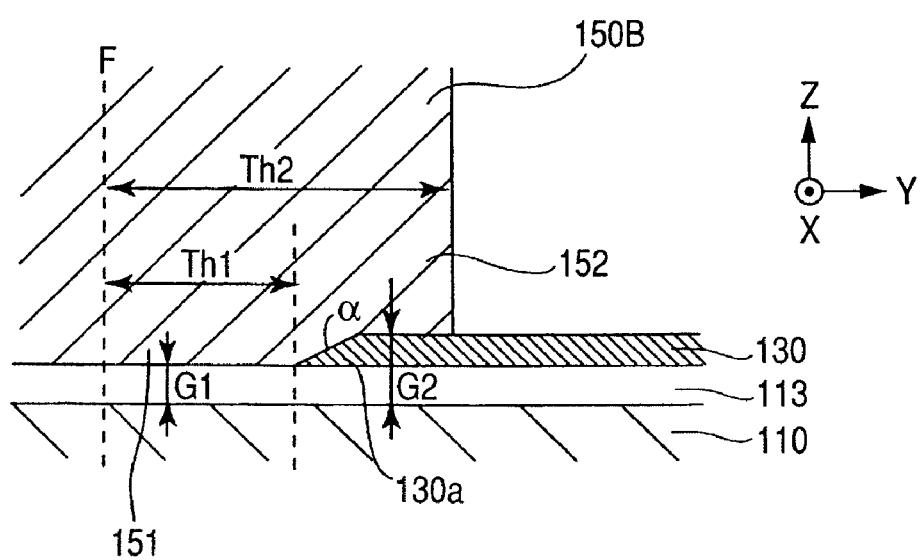
FIG. 13 is a sectional view showing a process step subsequent to the process step shown in FIG. 12.

Subsequently, as shown in FIG. 13, a bottom layer 150B of the return yoke layer 150 is formed on the exposed magnetic gap layer 113 and throat height determining layer 130. The bottom layer 150B is formed of a ferromagnetic material having a high saturation magnetic flux density such as Ni—Fe, Co—Fe, or Ni—Fe—Co. The bottom layer 150B is formed to have a maximum thickness in the height direction corresponding to the second throat height Th2. The bottom layer 150B can be formed at the same time as the magnetic connecting part 150b on the auxiliary yoke layer 111 by a plating method. In this way, on the bottom layer 150B of the return yoke layer 150, the first and second throat parts 151 and 152 are formed with the stepped part α formed by the front end surface 130a of the throat height determining layer 130 disposed thereon. Specifically, the first throat part 151 opposes the main magnetic pole layer 110 with the first gap spacing G1 (d1) at the recording medium-opposing surface F side and has a first throat height Th1. The second throat part 152 extends to the deeper side than the first throat part 151 in the height direction so as to oppose the main magnetic pole layer 110 with the second gap spacing G2 (=d1+d2) and has a second throat height Th2.

The process steps after the step of forming the bottom layer 150B of the return yoke layer 150 are the same as those of the first embodiment. Specifically, the bottom surface 150B of the return yoke layer 150 and the upper surface and the surroundings of the magnetic connecting part 150b are filled with the inorganic nonmagnetic material layer 160 such as $Al_2O_3$ or $SiO_2$. A polishing process (CMP: chemical mechanical polishing) is performed up to a position where the bottom layer 150B and the magnetic connecting part 150b can have a desired film thickness. Thereafter, the coil insulating underlayer 114, the second coil layer 115, and the coil insulating layer 116 are formed on the upper surface 150B1 (FIG. 2) of the bottom surface 150B planarized by the CMP process. The upper surface 150U of the return yoke layer 150 and the protective layer 120 are laminated thereon. An end surface serving as the recording medium-opposing surface F is mechanically polished to form the recording medium-opposing surface F. As described above, the step difference between the first throat part 151 and the second step 152 is small and there is not a sharply uneven surface on the bottom surface 150B of the return yoke layer 150. Therefore, there is little possibility of cracking to be generated in the bottom layer 150B when mechanical stress is applied thereto by a mechanical polishing process.

In this way, the perpendicular magnetic recording head H2 according to the second embodiment shown in FIGS. 8 and 9 is obtained.

In the embodiments of the present disclosure, the throat height determining layer 130 that defines the first throat height Th1 (the dimension of the first throat part 151 of the return yoke layer 150 in the height direction) is formed of an inorganic nonmagnetic material. Therefore, under high temperature environment such as during operation of the head, the throat height determining layer 130 is not likely to thermally deform and does not apply stress to the return yoke layer 150. It is thus possible to prevent deformation or cracking of the return yoke layer 150. According to the embodiments of the present disclosure, the magnetic gap layer 113 is formed of $Al_2O_3$ and the throat height determining layer 130 is formed of $SiO_2$ having a thermal expansion coefficient smaller than that of $Al_2O_3$. Therefore, the throat height determining layer 130 is not more likely to thermally expand. Moreover, since the magnetic gap layer 113 has a function of suppressing thermal expansion, it is possible to prevent the deformation and cracking of the return yoke layer 150 more efficiently. The magnetic gap layer 113 and the throat height determining layer 130 may be formed of the same inorganic nonmagnetic material.

In the embodiments of the present disclosure, the throat height determining layer 130 is formed by a lift-off process or a dry etching process. Therefore, it is possible to define the position of the front end surface 130a with high precision. The dimensional precision of the first throat height Th1 can be improved compared with the case in which the return yoke layer 150 is formed by a plating method.

In the embodiments of the present disclosure, the film thickness of the throat height determining layer 130 is designed so as to be smaller than the first throat height Th1. The step difference between the first throat part 151 and the second throat part 152 formed on the return yoke layer 150 can be suppressed small, thereby preventing a sharply uneven surface from being formed on the return yoke layer 150. Therefore, it is possible to prevent cracking of the return yoke layer 150 even when an external mechanical force is applied thereto.

In the embodiments of the present disclosure, the area of the main magnetic pole layer 110 opposing the return yoke layer 150 is narrowed in the first throat part 151 close to the recording medium-opposing surface F, while broadening in the second throat part disposed on the deeper side in the height direction. Therefore, even when the first throat height Th1 is small, by designing the gap spacing G1 in the first throat part 151 so as to be small, it is possible to prevent divergence of a magnetic flux oriented toward the return yoke layer 150 from the main magnetic pole layer 110. Thus, the recording magnetic field gradient characteristics can be improved. At the same time, even when the second throat height Th2 of the return yoke layer 150 is large, it is not necessary to suppress divergence of a magnetic flux oriented toward the recording medium M from the main magnetic pole layer 110. Thus, high recording magnetic field intensity can be maintained. With this, the recording magnetic field intensity and the recording magnetic field gradient are improved.

In the embodiments of the present disclosure, the main magnetic pole layer 110 is locally formed on a portion close to the recording medium-opposing surface F so that a magnetic flux is guided to the main magnetic pole layer 110 via the auxiliary yoke layer 111. However, the present disclosure may be similarly applied to the case in which the main magnetic pole layer extends to the deeper side in the height direction without modifying the shape of the main magnetic pole layer 110 and the auxiliary yoke layer 111.

As described in the first and second embodiments, the lamination order of the magnetic gap layer 113 and the throat height determining layer 130 is arbitrary. According to the first embodiment, since the magnetic gap layer 113 is formed after forming the throat height determining layer 130, it is easy to regulate the film thickness of the magnetic gap layer 113 compared with the second embodiment. Therefore, the control of the first gap spacing G1 is easy. On the other hand, according to the second embodiment, since the magnetic gap layer 113 is formed before forming the throat height determining layer 130, it is easy to regulate the position of the throat height determining layer 130 compared with the first embodiment. Therefore, the control of the first throat height Th1 is easy.

The terms and descriptions used herein are set forth by way of illustration only and are not meant as limitations. Those skilled in the art will recognize that many variations can be made to the details of the above-described embodiments without departing from the underlying principles of the disclosure. The scope of the disclosure should therefore be determined only by the following claims (and their equivalents) in which all terms are to be understood in their broadest reasonable sense unless otherwise indicated.

What is claimed is:

1. A perpendicular magnetic recording head, comprising:
a main magnetic pole layer; and
a return yoke layer laminated on the main magnetic pole layer with a magnetic gap layer formed of a nonmagnetic material disposed on an opposing surface opposite a recording medium, the return yoke layer comprising:
a first throat part opposing the main magnetic pole layer at a side close to the recording medium-opposing surface with a first gap spacing corresponding to a film thickness of the magnetic gap layer; and
a second throat part extending to a deeper side than the first throat part in a height direction and opposing the main magnetic pole layer with a second gap spacing greater than the first gap spacing,
wherein a throat height determining layer is provided on one of the main magnetic pole layer or the magnetic gap layer, the throat height determining layer defining a dimension of the first throat part of the return yoke layer in the height direction and formed of an inorganic nonmagnetic material, and
wherein the throat height determining layer has a film thickness smaller than the dimension of the first throat part of the return yoke layer in the height direction.

2. The perpendicular magnetic recording head according to claim 1, wherein the throat height determining layer is formed of an inorganic nonmagnetic material having a thermal expansion coefficient smaller than that of the nonmagnetic material of the magnetic gap layer.

3. A manufacturing method of a perpendicular magnetic recording head, comprising the steps of:
   forming a throat height determining layer on a main magnetic pole layer at a position of a front end surface thereof retreated from a position serving as an opposing surface opposite a recording medium by a desired distance
   in a height direction, the throat height determining layer defining the dimension of the return yoke layer in the height direction and formed of an inorganic nonmagnetic material;
   forming a magnetic gap layer on the throat height determining layer and the exposed main magnetic pole layer to thereby transfer the front end surface position of the throat height determining layer onto the surface of the magnetic gap layer; and
   forming a return yoke layer on the magnetic gap layer having the front end surface position transferred thereto, the return yoke layer being formed of an magnetic material, thereby forming first and second throat parts on the return yoke layer,
   wherein the first throat part defines the dimension of the return yoke layer in the height direction at the front end surface position of the throat height determining layer and opposes the main magnetic pole layer with a first gap spacing corresponding to a film thickness of the magnetic gap layer,
   wherein the second throat part extends to a deeper side than the first throat part in a height direction and opposes the main magnetic pole layer with a second gap spacing corresponding to the total film thickness of the magnetic gap layer and the throat height determining layer, and
   wherein the throat height determining layer has a film thickness smaller than the dimension of the first throat part of the return yoke layer in the height direction.

4. The manufacturing method of the perpendicular magnetic recording head according to claim 3, wherein the throat height determining layer is formed of an inorganic nonmagnetic material having a thermal expansion coefficient smaller than that of the nonmagnetic material of the magnetic gap layer.

5. A manufacturing method of a perpendicular magnetic recording head, comprising the steps of:
   forming a magnetic gap layer on a main magnetic pole layer, the magnetic gap layer being formed of a nonmagnetic material;
   forming a throat height determining layer on the magnetic gap layer at a position of a front end surface thereof retreated from a position serving as an opposing surface opposite a recording medium by a desired distance in a height direction, the throat height determining layer defining the dimension of the return yoke layer in the height direction as the desired distance and formed of an inorganic nonmagnetic material; and
   forming a return yoke layer on the throat height determining layer and the exposed magnetic gap layer, the return yoke layer being formed of an magnetic material, thereby forming first and second throat parts on the return yoke layer,
   wherein the first throat part defines the dimension of the return yoke layer in the height direction at the front end surface position of the throat height determining layer and opposes the main magnetic pole layer with a first gap spacing corresponding to a film thickness of the magnetic gap layer,
   wherein the second throat part extends to a deeper side than the first throat part in a height direction and opposes the main magnetic pole layer with a second gap spacing corresponding to the total film thickness of the magnetic gap layer and the throat height determining layer, and
   wherein the throat height determining layer has a film thickness smaller than the dimension of the first throat part of the return yoke layer in the height direction.

6. The manufacturing method of the perpendicular magnetic recording head according to claim 5, wherein the throat height determining layer is formed of an inorganic nonmagnetic material having a thermal expansion coefficient smaller than that of the nonmagnetic material of the magnetic gap layer.

* * * * *